United States Patent
Roitman et al.

(10) Patent No.: US 10,078,661 B1
(45) Date of Patent: Sep. 18, 2018

(54) RELEVANCE MODEL FOR SESSION SEARCH

(71) Applicant: International Business Machines Corporation, Armonk, NY (US)

(72) Inventors: Haggai Roitman, Yokneam Illit (IL); Doron Cohen, Gilon (IL); Nir Levine, Raanana (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/848,129

(22) Filed: Dec. 20, 2017

Related U.S. Application Data

(63) Continuation of application No. 15/591,413, filed on May 10, 2017.

(51) Int. Cl.
*G06F 17/30* (2006.01)

(52) U.S. Cl.
CPC .. *G06F 17/30395* (2013.01); *G06F 17/30014* (2013.01); *G06F 17/3053* (2013.01); *G06F 17/30554* (2013.01); *G06F 17/30867* (2013.01)

(58) Field of Classification Search
CPC ......... G06F 17/30395; G06F 17/30014; G06F 17/3053; G06F 17/30554; G06F 17/30867
See application file for complete search history.

(56) References Cited

U.S. PATENT DOCUMENTS

| | | | |
|---|---|---|---|
| 7,440,947 B2 * | 10/2008 | Adcock | G06F 17/2785 |
| 7,526,470 B1 | 4/2009 | Karnawat et al. | |
| 7,814,107 B1 * | 10/2010 | Thirumalai | G06F 17/30011 |
| | | | 707/749 |
| 7,827,125 B1 * | 11/2010 | Rennison | G06F 17/3066 |
| | | | 706/14 |
| 8,001,064 B1 * | 8/2011 | Rennison | G06F 17/3066 |
| | | | 706/14 |
| 8,073,869 B2 * | 12/2011 | Li | G06F 17/30675 |
| | | | 707/780 |
| 8,671,093 B2 | 3/2014 | Chapelle et al. | |
| 9,411,327 B2 * | 8/2016 | Park | G05B 15/02 |
| 9,443,028 B2 | 9/2016 | Song et al. | |
| 9,940,365 B2 * | 4/2018 | Zoryn | G06F 17/30864 |
| 2012/0150854 A1 | 6/2012 | Song et al. | |
| 2012/0303651 A1 * | 11/2012 | Tao | G06F 17/3053 |
| | | | 707/768 |
| 2014/0032311 A1 | 1/2014 | Cramer | |
| 2014/0279991 A1 | 9/2014 | Gupta et al. | |
| 2015/0286708 A1 * | 10/2015 | Tao | G06F 17/30675 |
| | | | 707/730 |

(Continued)

OTHER PUBLICATIONS

Wei Wu, Bin Li, Ling Chen, Chengqi Zhang and Philip S. Yu, "Improved Consistent Weighted Sampling Revisited" (Year: 2017).*

(Continued)

*Primary Examiner* — Rehana Perveen
*Assistant Examiner* — Alp Onat
(74) *Attorney, Agent, or Firm* — Stosch Sabo

(57) ABSTRACT

A session search relevance model identifies a user's dynamic information need based on a feedback model and a session relevance model. The feedback model is based on query changes in the session search and user interest in particular documents presented throughout the session search. The relevance model modifies a user's current query to retrieve documents most relevant to a user's information need.

1 Claim, 5 Drawing Sheets

(56) References Cited

U.S. PATENT DOCUMENTS

| | | |
|---|---|---|
| 2015/0331906 A1 | 11/2015 | Riley et al. |
| 2017/0161396 A1* | 6/2017 | Hassanzadeh .... G06F 17/30867 |
| 2017/0322930 A1* | 11/2017 | Drew ................ G06F 17/30011 |
| 2018/0040045 A1* | 2/2018 | Vaananen ........... G06F 17/3087 |
| 2018/0067910 A1* | 3/2018 | Alonso ............... G06F 17/2211 |

OTHER PUBLICATIONS

Boscarino et al., "Implicit relevance feedback from a multi-step search process: a use of query-logs", 5 pages. http://oai.cwi.nl/oai/asset/19758/19578B.pdf.

Lavrenko et al., "Relevance-Based Language Models", SIGIR'01, Sep. 9-12, 2001, New Orleans, LA, USA. 8 pages.

Yang et al., "Dynamic Information Retrieval Modeling", Synthesis Lectures on Information Concepts, Retrieval, and Services, #49, 2016. 28 pages.

List of IBM Patents or Patent Applications Treated as Related, dated Dec. 19, 2017, 2 pages.

Roitman et al., "Relevance Model for Session Search," U.S. Appl. No. 15/591,413, filed May 10, 2017.

* cited by examiner

|  | 2011 (train) | 2012 (test) | 2013 (test) |
|---|---|---|---|
| Sessions | | | |
| Sessions | 76 | 98 | 87 |
| Queries/session | 3.7±1.8 | 3.0±1.6 | 5.1±3.6 |
| Topics | | | |
| Sessions/topic | 1.2±0.5 | 2.0±1.0 | 2.2±1.0 |
| Judged docs/topic | 313±115 | 372±163 | 268±117 |
| Collection | | | |
| Name | ClueWeb09B | ClueWeb09B | ClueWeb12B |
| #documents | 28,810,564 | 28,810,564 | 15,700,650 |

FIG. 5A

| Method | TREC 2012 | | | | TREC 2013 | | | |
|---|---|---|---|---|---|---|---|---|
|  | nDCG@10 | nDCG | nERR@10 | MRR | nDCG@10 | nDCG | nERR@10 | MRR |
| last query ($q_n$) | 0.249 | 0.256 | 0.302 | 0.564 | 0.113 | 0.105 | 0.140 | 0.390 |
| FixInt [8] | 0.333 | 0.296 | 0.380 | 0.579 | 0.165 | 0.132 | 0.209 | 0.544 |
| BaysInt [8] | 0.334 | 0.297 | 0.382 | 0.674 | 0.171 | 0.131 | 0.208 | 0.527 |
| BatchUp [8] | 0.320 | 0.288 | 0.368 | 0.664 | 0.181 | 0.134 | 0.233 | 0.581 |
| LongTEM [10] | 0.332 | 0.295 | 0.369 | 0.667 | 0.167 | 0.131 | 0.205 | 0.539 |
| RM3($q_n$) [5] | 0.311 | 0.284 | 0.369 | 0.554 | 0.134 | 0.122 | 0.161 | 0.422 |
| RM3($Q^*$) | 0.305 | 0.284 | 0.384 | 0.547 | 0.153 | 0.129 | 0.203 | 0.553 |
| QA(uniform) [11] | 0.301 | 0.282 | 0.352 | 0.646 | 0.160 | 0.130 | 0.204 | 0.546 |
| QA(decay) [3] | 0.303 | 0.284 | 0.353 | 0.645 | 0.163 | 0.131 | 0.207 | 0.550 |
| QCM [13] | 0.309 | 0.263 | 0.366 | 0.574 | 0.158 | 0.129 | 0.201 | 0.535 |
| QCM(SAT) [12] | 0.298 | 0.281 | 0.347 | 0.635 | 0.158 | 0.129 | 0.202 | 0.548 |
| QCM(D/P) [12] | 0.299 | 0.281 | 0.350 | 0.631 | 0.166 | 0.130 | 0.208 | 0.550 |
| SRM(RM1) | 0.348† | 0.300 | 0.395† | 0.699† | 0.185† | 0.137 | 0.249† | 0.601† |
| SRM(QC) | 0.356†‡ | 0.304† | 0.405†‡ | 0.718†‡ | 0.193†‡ | 0.138 | 0.248†‡ | 0.612†‡ |

FIG. 5B

RELEVANCE MODEL FOR SESSION SEARCH

BACKGROUND

The present disclosure relates to information retrieval based on user queries, and, more particularly, to a relevance model for a session search.

A session search can include multiple steps t as a user submits one or more queries to locate relevant information satisfying the user's information need. A search manager can be configured to provide the user with documents most relevant to the user's estimated information need.

SUMMARY

Aspects of the present disclosure are directed to a method for modifying a search query to retrieve documents relevant to a user's information need. The method can include compiling session data comprising a first query, a second query, a first set of relevant documents for the first query, a set of user interactions with a subset of the first set of relevant documents, and a set of query changes between the first query and the second query. The method can further include generating a feedback model estimating a relevance of search terms to the user's information need based on the set of query changes and the set of user interactions with the subset of the first set of relevant documents. The method can further include generating a relevance model estimating a relevance of search terms to the user's information need based on the feedback model and a session relevance model. The method can further include modifying the second query based on the relevance model. The method can further include outputting a second set of relevant documents to a user interface responsive to executing the modified second query.

Aspects of the present disclosure are further directed toward a system including a search manager comprising a memory and a processor and communicatively coupled to a user interface and a set of nodes storing a corpus of data. The search manager can be configured to execute a session search configured to satisfy an information need by updating a relevance model of the information need responsive to receiving a reformulated query based on input to the user interface. The relevance model can be based on a session relevance model and a feedback model configured to estimate a relevance of respective search terms to the information need according to the reformulated query, a previous query, and a set of selected documents presented responsive to the previous query and selected based on input received from the user interface. The search manager can be further configured to modify the reformulated query based on the updated relevance model. The search manager can be further configured to present an updated set of relevant documents to the user interface responsive to executing the modified reformulated query and retrieving the updated set of relevant documents from the corpus of data.

Additional aspects of the present disclosure are directed toward a computer program product comprising a computer readable storage medium having program instructions embodied therewith. The program instructions can be executed by a processor to cause the processor to perform a method comprising compiling, for a session search, session data comprising a first query, a second query, a first set of relevant documents for the first query, a set of user interactions with a subset of the first set of relevant documents, and a set of query changes between the first query and the second query. The program instructions can be further configured to cause the processor to perform a method further comprising generating a feedback model estimating a relevance of search terms to an information need of the session search based on the set of query changes and the set of user interactions with the subset of the first set of relevant documents and generating a relevance model estimating a relevance of search terms to the information need based on the feedback model and a session relevance model. The program instructions can be further configured to cause the processor to perform a method further comprising modifying the second query based on the relevance model and outputting a second set of relevant documents to a user interface responsive to executing the modified second query.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5A illustrates a table of datasets used in testing some embodiments of the present disclosure.

FIG. 5B illustrates a table of test results comparing some embodiments of the present disclosure to state-of-the-art alternatives.

Figure 1:
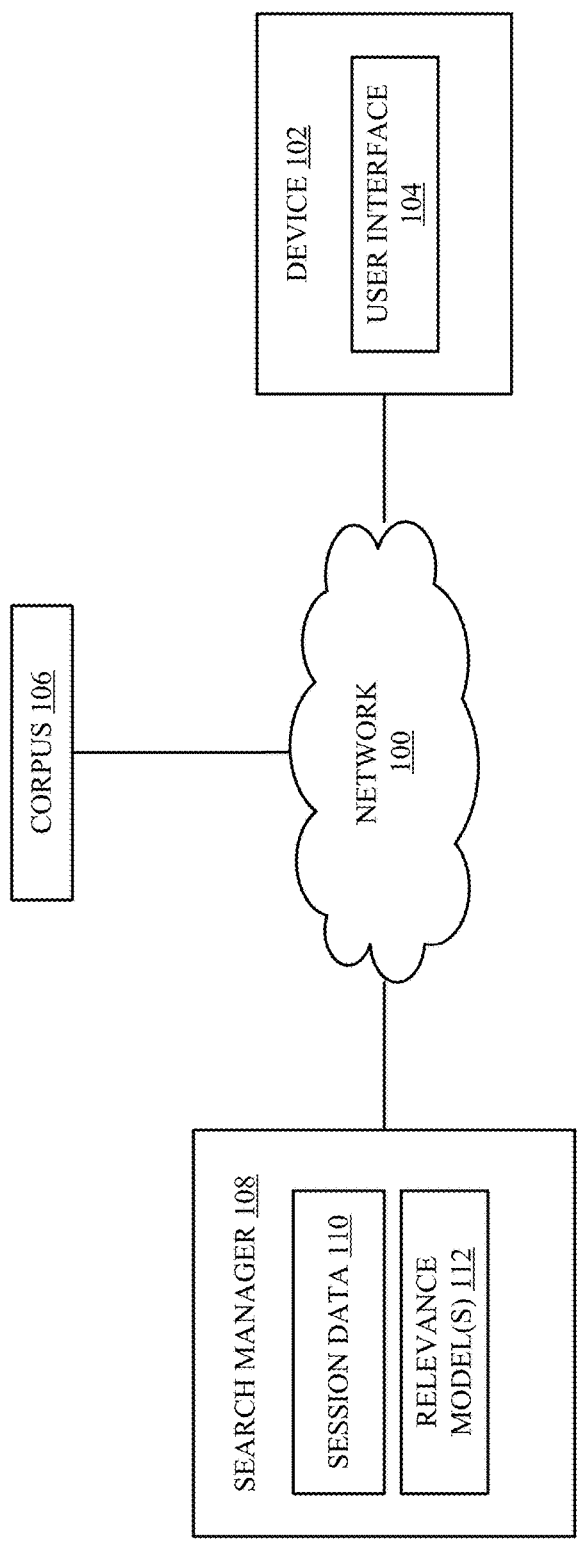
FIG. 1 illustrates a block diagram of a network that can implement aspects of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward information retrieval based on user queries in session searches. More particular aspects are directed toward modifying a user's current query to retrieve documents most relevant to a user's information need based on a relevance model for the session search. Aspects of the present disclosure generate a relevance model based on a session relevance model and a feedback model. The session relevance model uses historical data to generate a dynamic representation of the user information need prior to a current user query. The feedback model monitors user interactions (e.g., document impressions, clicks, and query reformulations) to better understand a user's information need at the current query. The relevance model can modify the user query to retrieve documents most relevant to the user's information need.

Aspects of the present disclosure provide numerous advantages. First, aspects of the present disclosure generate a feedback model to capture changes in a user's information need based on user interactions (e.g., document impressions, user clicks, and user query reformulations). Thus, aspects of the present disclosure are able to identify changes in a user's information need over the course of a session search and provide an estimation of the user's current information need. Second, aspects of the present disclosure moderate the importance of the session relevance model and the feedback model in the relevance model based on an information gain associated with the feedback model relative to the session relevance model. Thus, the relative importance of the two models is moderated by a logical calculation rather than an arbitrary parameter. Third, aspects of the present disclosure anchor the feedback model to a query model to avoid query drift. Fourth, aspects of the present disclosure outperform state-of-the-art alternative relevance models as described in further detail hereinafter with respect to FIG. 5A-5B.

The aforementioned advantages are example advantages, and aspects of the present disclosure exist which may contain all, some, or none of the aforementioned advantages while remaining within the spirit and scope of the present disclosure.

Referring now to the figures, FIG. 1 illustrates a block diagram of a network in which some embodiments of the present disclosure can be implemented. The network 100 communicatively couples device 102, corpus 106, and search manager 108 to one another via a physical or wireless connection. Although corpus 106 and search manager 108 are shown as being physically separated from device 102 in FIG. 1, in some embodiments, corpus 106 and/or search manager 108 can be stored in device 102.

Device 102 can be, but is not limited to, a computer, a laptop, a workstation, a cell phone, a tablet, or another user device capable of receiving search queries from a user and presenting search results to a user. Device 102 can execute an application and/or web browser capable of receiving a user query and providing relevant documents in response to the user query. User interface 104 can comprise, but is not limited to, alone or in combination, a monitor, a screen, a touch screen, a keyboard, a mouse, a microphone, a camera, and/or other input/output devices capable of receiving input from a user and/or presenting output to a user.

Corpus 106 contains any one or more of the following: documents, web pages, image files, video files, audio files, and so on. Although corpus 106 is shown as a single entity communicatively coupled to network 100, corpus 106 can be numerous entities (e.g., a plurality of nodes) representing, for example, information available on a distributed network such as, but not limited to, the internet, an intranet, a database, or a different collection of data.

Search manager 108 stores session data 110 and relevance model 112. Session data 110 comprises a session history generated by user interactions received from device 102 based on input to user interface 104. Session data 110 can comprise, for example, relevant documents, user clicks, and query reformulations. Relevant documents can comprise a subset of corpus 106 retrieved in response to a user query. User clicks can refer to user interactions with a subset of the relevant documents presented on user interface 104. Query reformulations can refer to added, removed, and retained search terms between any two queries, between any two sequential queries, or between a current query and a sequentially previous query, according to various embodiments.

Relevance model 112 uses information from session data 110 to identify a user's information need. Relevance model 112 is described in more detail hereinafter with respect to FIG. 4.

Figure 2:
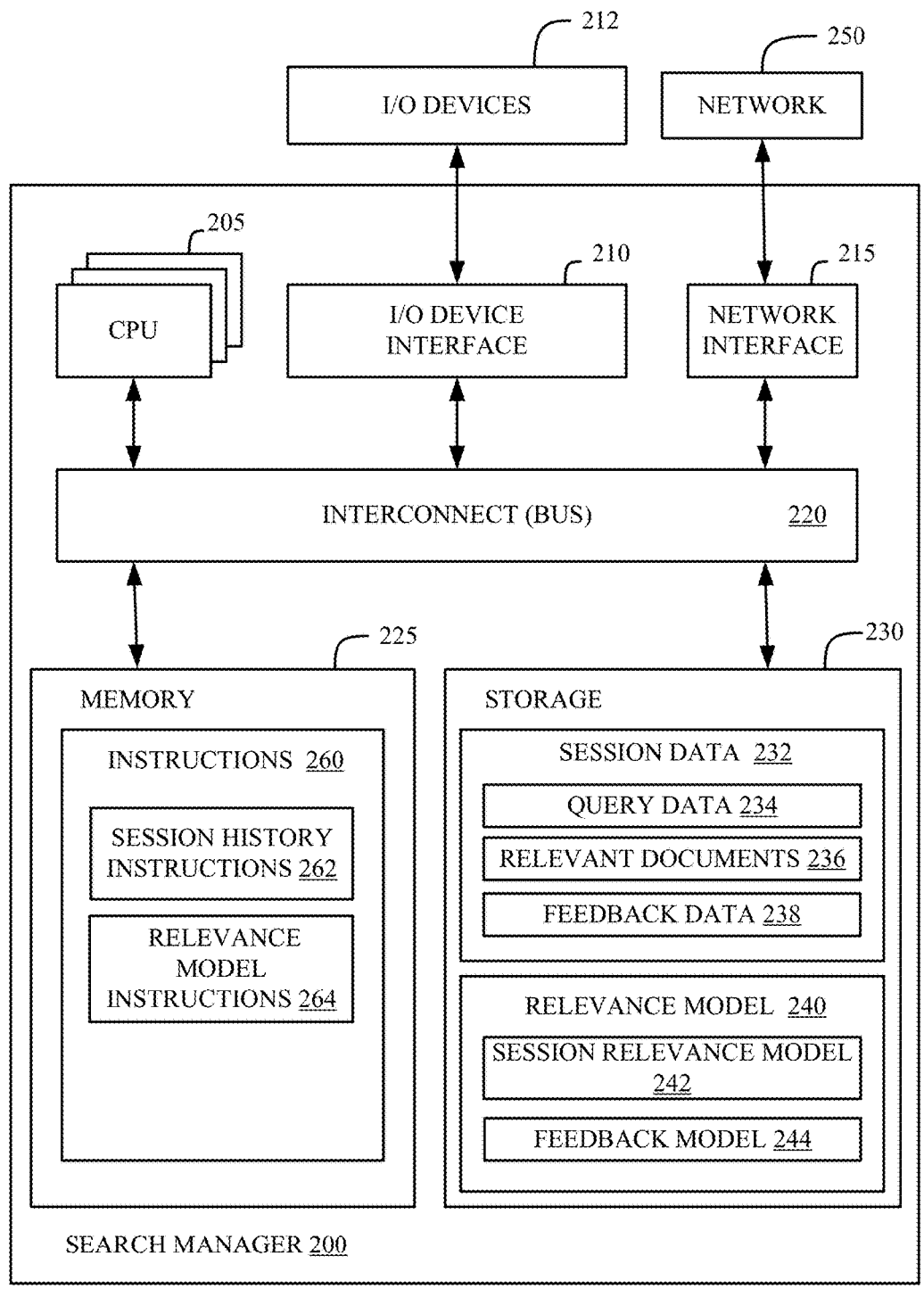
FIG. 2 illustrates a block diagram of a search manager in accordance with some embodiments of the present disclosure.

Referring now to FIG. 2, illustrated is a block diagram of a search manager 200 in accordance with some embodiments of the present disclosure. In some embodiments, the search manager 200 is consistent with search manager 108 of FIG. 1. In some embodiments, search manager 200 performs operations in accordance with FIGS. 3-4 as described in further detail hereinafter. The search manager 200 can include a memory 225, storage 230, an interconnect (e.g., BUS) 220, one or more processors 205 (also referred to as CPUs 205 herein), an I/O device interface 210, I/O devices 212, and a network interface 215.

Each CPU 205 retrieves and executes programming instructions stored in the memory 225 or storage 230. The interconnect 220 is used to move data, such as programming instructions, between the CPUs 205, I/O device interface 210, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the search manager 200 via the I/O devices 210 or a communication network 250 via the network interface 215.

In some embodiments, the memory 225 stores instructions 260 and the storage 230 stores session data 232 and relevance model 240. However, in various embodiments, the instructions 260, the session data 232, and relevance model 240 are stored partially in memory 225 and partially in storage 230, or they are stored entirely in memory 225 or entirely in storage 230, or they are accessed over a network 250 via the network interface 215.

Session data 232 comprises query data 234, relevant documents 236, and feedback data 238. Query data 234 comprises queries received via I/O devices 212 through I/O device interface 210 or via network 250 through network interface 215 (e.g., from user device 102 of FIG. 1). Query data 234 can comprise a search string of one or more alphanumeric search terms. In some embodiments, query data 234 is received via a microphone and converted to one or more alphanumeric search terms.

Relevant documents 236 comprise documents retrieved from a corpus and identified as relevant to a given user query. In some embodiments, relevant documents 236 comprise the top-k documents for a given query. Relevant documents 236 are discussed in more detail hereinafter with respect to operation 308 of FIG. 3.

Feedback data 238 comprises a measure of user interest in one or more of the relevant documents 236. Feedback data 238 can comprise, but is not limited to, user clicks on particular documents of the relevant documents 236, a measurement of time on which a user paused on a screen presenting a subset of the relevant documents 236, and documents saved to a user device from the relevant documents 236. In some embodiments, feedback data 236 further comprises biometric feedback data which can be received from, for example, a video camera on the user device configured to track eye movement of the user and determine a time the user spent reading one or more of the relevant documents 236.

In some embodiments, session data 232 stores, for each step in a session history having n steps, a tuple of data, $S_t= \langle Q_t, D_t, C_t \rangle$, for steps $1 \leq t \leq n-1$. The tuple of data comprises the query data 234 (denoted as $Q_t=(q_1, q_2, \ldots, q_t)$), the relevant top-k documents 236 retrieved for the respective query (denoted as $D_t=(D_{q1}^{[k]}, D_{q2}^{[k]}, \ldots, D_{qt}^{[k]})$), and feedback data 238 (denoted as $C_t=(C_{q1}, C_{q2}, \ldots, C_{qt})$) indicating user interest with one or more of the relevant documents 236 (such as, for example, user clicks on one or more of the relevant documents 236).

Storage 230 further contains relevance model 240 which is based on session relevance model 242 and feedback model 244. Session relevance model 242 can estimate user information need at a current step t based on user queries generated in steps previous to step t. Feedback model 244 can estimate user information need at a current step t based on query reformulation between a previous step t−1 and the current step t, and further based on feedback data 238. Relevance model 240 is described in more detail hereinafter with respect to FIG. 4.

The instructions 260 store processor executable instructions for various methods such as the methods shown and described hereinafter with respect to FIGS. 3-4. The instructions 260 can include session history instructions 262 and relevance model instructions 264. Session history instructions 262 can comprise instructions for collecting session data 232. Relevance model instructions 264 comprise instructions for generating relevance model 240, session relevance model 242, and feedback model 244.

In various embodiments, the I/O devices 212 can include an interface capable of presenting information and receiving input. For example, I/O devices 212 can receive input from a user and present information to a user interacting with search manager 200 and/or a device (e.g., device 102 of FIG. 1).

In some embodiments, the network 250 is consistent with network 100 of FIG. 1. The network 250 can connect (via a physical or wireless connection) the search manager 200 with a device (e.g., device 102 of FIG. 1) executing a search query.

Figure 3:
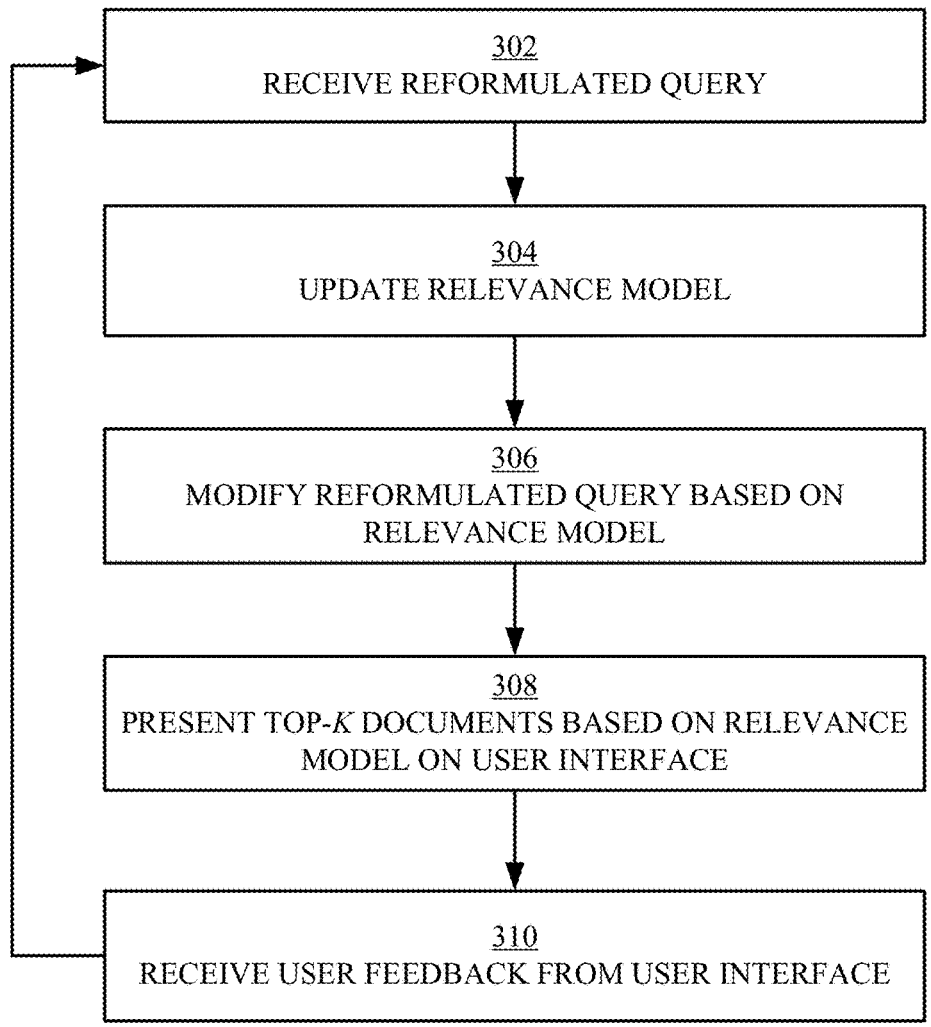
FIG. 3 illustrates a flowchart of an example method for using a relevance model according to some embodiments of the present disclosure.

FIG. 3 illustrates a flowchart of an example method for using a relevance model to provide relevant documents to a user. In some embodiments, the method 300 can be implemented by a search manager functioning in a network (e.g., search manager 108 of FIG. 1). In some embodiments, the method 300 can be implemented by a processor executing instructions (e.g., processor 205 executing instructions 260 of FIG. 2). The method 300 will hereinafter be described as being implemented by the search manager for consistency, however, one skilled in the art will appreciate that the following operations can be implemented by one or more co-located or distributed computer architecture components.

The method 300 starts at operation 302 by receiving a reformulated query (e.g., a new query that can be a query identical to a previous query or a query different from a previous query) based on user input (e.g., from user input to user device 102 of FIG. 1). A reformulated query can comprise a search string in the form of a question, a compilation of words, or another alphanumeric string of search terms. In some embodiments, the reformulated query is converted from audio input into a compilation of words based on the audio input (e.g., a person speaking a question into a user device having a microphone and voice recognition software stored thereon).

In operation 304, the search manager updates a relevance model based on the reformulated query. Operation 304 is described in more detail hereinafter with respect to FIG. 4.

In operation 306, the search manager modifies the reformulated query based on the relevance model. The search manager can modify the reformulated query using any number of techniques such as, but not limited to, applying a respective weight (e.g., a relevance factor) to each respective term in the reformulated query with terms identified as more relevant (based on the relevance model) having a higher weighting and terms identified as less relevant (based on the relevance model) having a lower weighting. The search manager can additionally, or alternatively, expand the query by adding related terms associated with search terms having a relevance score above a first threshold. A relevance factor can also be applied to added search terms based on the relevance model. The search manager can additionally, or alternatively, remove search terms having a relevance score below a second threshold.

In operation 308, the search manager presents the most relevant k documents (e.g., 10 documents) in response to executing the reformulated query modified in operation 306 against a corpus of data (e.g., corpus 106 of FIG. 1). Operation 308 presents the most relevant k documents on the user interface. In some embodiments, the most relevant k documents can be retrieved according to known query execution methods. In some embodiments, the most relevant k documents are retrieved from a subset of documents previously identified as relevant to the user's information need and re-scored and/or re-ranked in operation 308 based on the relevance model updated in operation 304 and the reformulated query modified in operation 306.

In some embodiments, the most relevant k documents are presented as a list of hyperlinked titles with each title corresponding to a document and having a summary of the document adjacent to the hyperlinked title (e.g., an abstract, or a preview of the beginning of the document). As will be appreciated by one skilled in the art, the most relevant k documents can be presented in any number of similar or dissimilar arrangements as the arrangement previously described.

In operation 310, the search manager receives user feedback from the user interface. The user feedback can indicate user interest in particular documents of the most relevant k documents presented in operation 308. The user feedback can comprise, but is not limited to, user clicks on particular relevant documents and changes between the received query from operation 302 and another reformulated query the user generates based on the information provided to the user in operation 308.

Numerous other forms of feedback are contemplated, such as, but not limited to, an amount of time a particular document is presented on the user interface (e.g., the time a user spent reviewing a document after clicking on a hyperlink to that document, or a time a user spent on a portion of the list containing a subset of the most relevant k documents), biometric feedback such as an amount of time a user spent reading respective summaries based on eye-tracking received through a video camera attached to the user device, and so on. The user feedback collected in operation 310 can identify documents selected by the user as being particularly relevant to the user's information need. The selected documents can be intentionally selected by the user (e.g., responsive to user clicks) or unconsciously selected by the user (e.g., responsive to a time the user spent reading a summary of the selected document, where the user may be unaware that the time spent reading the summary constitutes user feedback to the search manager).

The search manager implementing the method 300 iterates through operations 302-310 until no reformulated queries are received and the session search ends.

Figure 4:
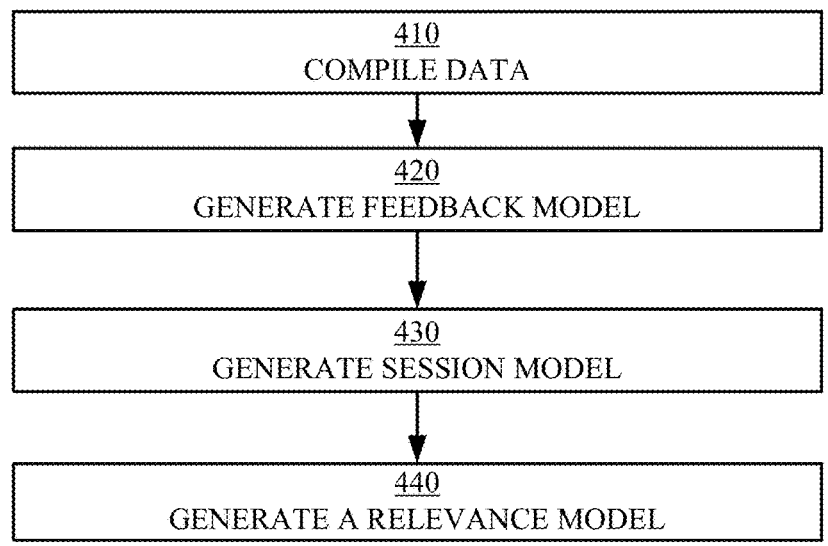
FIG. 4 illustrates a flowchart of an example method for generating a relevance model according to some embodiments of the present disclosure.

FIG. 4 illustrates a flowchart of an example method for generating and updating a relevance model in accordance with some embodiments of the present disclosure. In some embodiments, the method 400 is a sub-method of operation 304 of FIG. 3. The method 400 can be implemented by a search manager functioning on a network (e.g., search manager 108 of FIG. 1). The method 400 can likewise be implemented by a processor executing instructions (e.g., processor 205 executing instructions 260 of FIG. 2). The method 400 will hereinafter be described as being implemented by the search manager for consistency, however, one skilled in the art will appreciate that the following operations can be implemented by one or more co-located or distributed computer architecture components.

The method 400 begins at operation 410 by compiling data from the session search. For a given session, a user's information need can be denoted as I. During the session, the user's information need can change as a result of knowledge gained during the session search. A change in a user's information need can be associated with changes to user queries at each step t in the session. Thus, a change in a user's information need can be defined as $\Delta I_t \stackrel{def}{=} I_{t-1} \to I_t$. $\Delta I_t$ can be associated with changes in a user query. For example, changes from a previous query $q_{t-1}$ to a current query $q_t$ can indicate a change in the user's information need.

At each step of the session search, a user can submit a new query, notated as $q_t$. A search manager retrieves a set of top-k documents $D_{qt}^{[k]}$ from a corpus of documents. Each result can include a title, a link to the document, and a summary of the document. A user can click on one or more documents from the set of top-k documents $D_{qt}^{[k]}$. The user's clicks can be stored as a set of clicked results notated by $C_{qt}$. At step t+1 the user can submit a new query based on the information gathered in the previous step. The process can iterate any number of times. The session history can be denoted by $S_{n-1}$ and can represent user queries, retrieved result documents, and clicked results. Thus, for each step, the search manager stores a tuple of information, notated as $S_t=(Q_t, D_t, C_t)$ in operation 410. $Q_t$ represents the series of queries submitted by a user ($Q_t=(q_1, q_2, \ldots, q_t)$). Likewise, $D_t$ represents the series of top-k results corresponding to each query ($D_t=(D_{q1}^{[k]}, D_{q2}^{[k]}, \ldots, D_{qt}^{[k]})$). Likewise, $C_t$ represents user clicks corresponding to each set of retrieved results ($C_t=(C_{q1}, C_{q2}, \ldots, C_{qt})$).

Operation 410 can further compile query change data using changes in a current query relative to at least one previous query. In some embodiments, the at least one previous query is the sequentially previous query to the current query. Changes between queries comprise term retention, term addition, and term removal. Terms that are retained (i.e., appear in both queries) can be denoted as $\Delta q_t^{\leftrightarrow}$. Terms that are added (i.e., appear in the current query and not in the previous query) can be denoted as $\Delta q_t^+$. Terms that are removed (i.e., terms that appear in the previous query and not in the current query) can be denoted as $\Delta q_t^-$. Thus, each term of a set of terms w' appearing in some vocabulary V and further appearing in at least one of the current query and the previous query can be categorized as either $\Delta q_t^{\leftrightarrow}$, $\Delta q_t^+$, or $\Delta q_t^-$. Thus, query reformulation for a given step t can be defined as $\Delta q_t \in \{\Delta q_t^{\leftrightarrow}, \Delta q_t^+, \Delta q_t^-\}$).

In operation 420, the search manager can generate a feedback model based on the compiled data. Feedback model $\theta_{F_t}$ is used to identify terms w that most explain a change in a user's information need (i.e., $\Delta I_t$). $\theta_{F_t}$ can be defined according to Equation 1.

$$p(w|\theta_{F_t}) \stackrel{def}{=} \Sigma_{d \in F_t} p^{[0]}(w|\theta_d) \cdot (\Sigma_{\Delta q} p(d|\theta_{\Delta q_t}) p(\Delta q_t)) \quad \text{Equation 1:}$$

In Equation 1, the term $p^{[0]}(w|\theta_d)$ is a Dirichlet smoothed language model of text x having parameter $\mu$ which can be defined according to Equation 2.

$$p^{[\mu]}(w|\theta_x) \stackrel{def}{=} \frac{tf(w, x) + \mu \frac{tf(w, D)}{|D|}}{|x| + \mu} \quad \text{Equation 2}$$

In Equation 2, the term tf(w, D) represents the number of appearances of term w in corpus D.

In Equation 1, the term $F_t$ compiles all documents selected by the user to the current step in the session history (e.g., $F_t = \cup_{1 \le j \le t} C_{q_j}$). If there are no user selections (e.g., if the user has not clicked on any presented document hyperlinks) in the session history, then the search manager can estimate a pseudo information need, denoted as $Q_t'$. $Q_t'$ can be estimated by concatenating the text of all observed queries in $Q_t$ and defining $F_t$ as the set of top-m results in $\cup_{1 \le j \le t} D_{q_j}$ with the highest query likelihood given $Q_t'$.

In Equation 1, the term $p(\Delta q_t)$ denotes the prior likelihood that the user will add, remove, or retain terms while reformulating a query from $q_{t-1}$ to $q_t$. These likelihoods can be pre-estimated based on historical data, or they can be estimated as each having an equal probability (i.e., a 1/3 probability a respective term is added, a 1/3 probability the respective term is removed, and a 1/3 probability the respective term is retained).

Operation 420 can further estimate a language model of the user's query at step t (denoted as $\theta_{q_t}$) representing the likelihood of each term in the query. Operation 420 can further estimate a language model of the user's query change at step t (denoted as $\theta_{\Delta q_t}$) representing the likelihood of each query change in the query.

In Equation 1, the term $p(d|\theta_{\Delta q_t})$ estimates the relevance of a given document based on the change in query terms and is estimated according to Equation 3.

$$p(d|\theta_{\Delta q_t}) \propto \frac{p(\Delta q_t|\theta_d)}{\sum_{d' \in F_t p(\Delta q_t|\theta_{d'})} p(\Delta q_t|\theta_{d'})} \quad \text{Equation 3}$$

In Equation 3, the term $p(\Delta q_t|\theta_d)$ estimates the relevance a changed query term has on the relevance of a document and can be defined according to Equation 4.

$$p(\Delta q_t|\theta_d) \stackrel{def}{=} \begin{cases} \prod_{w' \in \Delta q_t} p^{[\mu]}(w'|\theta_d), & \Delta q_t \in \{\Delta q_t^{\leftrightarrow}, \Delta q_t^+\} \\ 1 - \sum_{w' \in \Delta q_t^-} p^{[0]}(w'|\theta_d), & \Delta q_t = \Delta q_t^- \end{cases} \quad \text{Equation 4}$$

Equation 4 increases the estimated relevance of documents associated with added and retained query terms in a reformulated query and decreases the estimated relevance of documents associated with removed query terms in the reformulated query.

Equation 5 is a modification of Equation 1 and can be used, in some embodiments, to anchor the feedback model $\theta_{F_t}$ to the query model $\theta_{q_t}$ and thereby manage query drift (i.e., the inadvertent deviation from a user's information need as a result of query expansion).

$$p(w|\theta'_{F_t}) \stackrel{def}{=} (1-\lambda_t)p^{[0]}(w|\theta_{q_t}) + \lambda_t p(w|\theta_{F_t}) \qquad \text{Equation 5:}$$

Equation 5 uses anchoring parameter $\lambda_t$. Anchoring parameter $\lambda_t$ can be defined by Equation 6.

$$\lambda_t \stackrel{def}{=} \lambda \cdot sim(q_t, q_n) \qquad \text{Equation 6:}$$

In Equation 6, $\lambda$ is a parameter between 0 and 1, inclusive. The similarity measure between $q_t$ and $q_n$ can be any one of numerous similarity measures. For example, the similarity measure can be semantic measures such as, but not limited to, Explicit Semantic Analysis, Word2Vec based Cosine similarity, and so on. In some embodiments, the similarity measure is an inverse document frequency (IDF) boosted Generalized-Jaccard similarity measure defined by Equation 7.

$$sim(q_t, q_n) \stackrel{def}{=} \frac{\sum_{w \in q_t \cap q_n} \min(tf(w, q_t), tf(w, q_n)) \cdot idf(w, D)}{\sum_{w \in q_t \cup q_n} \max(tf(w, q_t), tf(w, q_n)) \cdot idf(w, D)} \qquad \text{Equation 7}$$

In equation 7, the numerator sums the products of a number of appearances of a given word appearing in both the current query and a previous query by the IDF factor for the given word. Likewise, the denominator sums the products of a number of appearances of each word appearing in either the current query and/or a previous query by the IDF factor for the given word. As shown in Equation 7, the numerator sums the products based on the number of appearances of the given word appearing in the query having the fewer number of appearances of the given word. In contrast, the denominator sums the products based on the number of appearances of the given word appearing in the query having the larger number of appearances of the given word.

IDF is a technique employed to manage terms that appear too often in a set of documents to have an identifiable relevance to a user's information need. In particular, IDF for a given term can be calculated by the log of a fraction having a numerator equal to the total number of documents in a corpus and a denominator equal to the number of documents in the corpus that contain the given term.

Thus, according to the $\lambda_t$ definition provided in Equation 6, the more similar query $q_t$ is to current query $q_n$, the more relevant is the query change (associated with the change in user's information need—$\Delta I_t$) is assumed to be to the current user's information need (i.e., $I_n$). For example, if the difference between query $q_t$ and current query $q_n$ comprises one added search term, then the one added search term is associated with a higher relevance to the user's current information need. In contrast, if the difference between query $q_t$ and current query $q_n$ comprises three added search terms and four removed search terms, then it may be difficult to precisely estimate the user's current information need based on the significant difference between the two most recent queries.

In operation 430, the search manager generates a session relevance model $\theta_{s_{t-1}}$ based on the tuple information compiled in operation 410. Session relevance model $\theta_{s_{t-1}}$ estimates the dynamic information need prior to the current step.

In operation 440, the search manager generates a relevance model using the session relevance model and the feedback model. In some embodiments, the relevance model is a first-order autoregressive model for estimating the relevance of terms that are most relevant to the user's information need. In some embodiments, the first-order autoregressive model is defined by Equation 8.

$$p(w|\theta_{s_t}) \stackrel{def}{=} \gamma_t p(w|\theta_{s_{t-1}}) + (1-\gamma_t) p(w|\theta_{F_t}) \qquad \text{Equation 8:}$$

In Equation 8, the term $\theta_{s_{t-1}}$ is the session relevance model that estimates the dynamic information need prior to the current step. The term $\theta_{F_t}$ is the feedback model based on the current query $q_t$ that estimates a change in the user's information need between previous queries and the current query (e.g., based on Equation 1 or Equation 5). The parameter $\gamma_t$ is used to moderate the importance assigned between model exploitation (i.e., $\theta_{s_{t-1}}$) and model exploration (i.e., $\theta_{F_t}$). The parameter $\gamma_t$ can be calculated according to Equation 9.

$$\gamma_t \stackrel{def}{=} \gamma \cdot \exp^{-D_{KL}(\theta_{F_t} \| \theta_{s_{t-1}})} \qquad \text{Equation 9}$$

In Equation 9, $\gamma$ is a parameter between 0 and 1 inclusive, and $D_{KL}(\theta_{F_t} \| \theta_{s_{t-1}})$ can represent a measure of similarity between two distributions. For example, $D_{KL}(\theta_{F_t} \| \theta_{s_{t-1}})$ can be based on Negative Cross-Entropy, Jenson-Shannon Divergence, or other measures. In some embodiments, $D_{KL}(\theta_{F_t} \| \theta_{s_{t-1}})$ represents the Kullback-Leibler divergence between the un-smoothed models $\theta_{F_t}$ and $\theta_{s_{t-1}}$. In some embodiments, $D_{KL}(\theta_{F_t} \| \theta_{s_{t-1}})$ represents the information gain associated with using model $\theta_{F_t}$ relative of model $\theta_{s_{t-1}}$. Embodiments of the present disclosure derive relevance model $\theta_{s_n}$ by inductively applying Equation 1 with $\theta_{s_0} \stackrel{def}{=} 0$.

Thus, the method 400 can use the aforementioned equations to generate and/or update a relevance model for a session search.

FIGS. 5A and 5B illustrate experimental results using aspects of the present disclosure. FIG. 5A illustrates the datasets used in testing aspects of the present disclosure. FIG. 5A provides benchmark details for the Text Retrieval Conference (TREC) 2011-2013 session tracks used in the testing. The Category B subsets of the ClueWeb09 (2011-2012 tracks) and ClueWeb12 (2013 track) collections were used. Each collection has approximately 50 million documents. Documents with spam scores below 70 were removed. Documents were indexed and searched using the Apache Solr search engine. Documents and queries were processed using Solr's English text analysis (i.e., tokenization, Poter stemming, stopwords, etc.).

FIG. 5B illustrates evaluation results. The testing established baselines for comparison using known state-of-the-art language modeling methods. These methods include methods utilizing session context data such as FixedInt (with $\alpha=0.1$, $\beta=1.0$) and its Bayesian extension BayesInt (with $\mu=0.2$, $\nu=5.0$). These two methods combine the query $q_n$ model with the history queries $Q_n$ and centroid models of clicks $C_n$. Another session context method is the model BatchUp (with $\mu=2.0$, $\nu=15.0$) which iteratively interpolates the clicks language model up to each step t using a batched approach. Another session context method is the Expectation Maximization (EM) approach, denoted as LongTEM (with $\lambda_q=0$, $\sigma_c=20$, and $\sigma_{NC}=1.0$), which interpolates each query $q_t$ model with its corresponding session history model that is based on both clicked (C) and non-clicked (NC) results in the set of retrieved documents for a given query.

These interpolated models are then combined based on the amount of their relevant session history estimated using the EM-algorithm.

The comparison methods also include two versions of the Relevance Model. The first version is a basic RM3 model, denoted RM3($q_n$), which is learned using the last query $q_n$ and the top-m retrieved documents as pseudo relevance feedback. The second Relevance Model, denoted RM3($Q_n'$), uses the pseudo information need $Q_n'$ rather than $q_n$.

The comparison methods also include two query aggregation methods—QA(uniform) and QA(decay). QA(uniform) is equivalent to submitting $Q_n'$ as the query. QA(decay) applies an exponential decay approach to prefer recent queries to early ones (decay parameter $\gamma=0.92$).

The comparison methods also included three versions of the Query Change Model (QCM). The QCM parameters were set as $\alpha=2.2$, $\beta=1.8$, $\varepsilon=0.07$, $\delta=0.4$, and $\gamma=0.92$. The three QCM models included a basic QCM model, a QCM (SAT) model that utilized only "satisfied" clicks (clicks with a dwell time of at least 30 seconds), and a QCM(DUP) model which ignores duplicate queries within a session.

Finally, various implementations of aspects of the present disclosure are referred to as a Session Relevance Model (SRM). These include SRM(QC) and SRM(RM1) models. The SRM(RM1) model uses the RM1 document score (i.e., $p(d|q_n)$) instead of the query-change driven score discussed in the feedback model in order to isolate the effect of the query-change driven score in the feedback model (see Equations 1-7 discussed with respect to operation 430). SRM(QC) includes the query change information used in the feedback model.

The testing was performed by retrieving the top-2000 documents with the highest query likelihood (QL) score given the last query $q_n$. The retrieved documents were then re-ranked using the various baselines by multiplying their QL score with the score determined by each method. The document scores for the various language model methods were further determined using the KL-divergence score with each model clipped using a fixed cut-off of 100 terms. The TREC session track "trec_eval" tool was used for measuring retrieval performance, namely, normalized discounted cumulative gain (nDCG) @10 (i.e., the first 10 results), nDCG(@2000), normalized expected reciprocal ranking (nERR) @10, and mean reciprocal rank (MRR) of each baseline. The free parameters of RM3 and SRM were optimized using the TREC 2011 training set to maximize mean average precision (MAP). Statistical significance of the test results were measured using the paired two-tailed Student's t-test for 95% confidence.

As shown in FIG. 5B, the SRM models provided at least 6.6%, 2.4%, 4.1%, and 5.3% better performance in nDCG@10, nDCG, nERR@10, and MRR respectively compared to the next best performing model.

Furthermore, SRM models outperformed RM3 models by at least 14%, 7.0%, 9.8%, and 9.5% in nDCG@10, nDCG, nERR@10, and MRR respectively. Thus, using a session-context sensitive approach (as done with the SRM model) provides a significant benefit compared to an ad-hoc relevance modeling approach (i.e., one that only focuses on the last query in the session) as done with RM3.

Furthermore, SRM models outperformed QA and QCM variants by at least 18.5%, 6.1%, 15.1%, and 9.5% in nDCG@10, nDCG, nERR@10, and MRR respectively. Thus, using a query-expansion strategy based on the user's dynamic information need (as done with the SRM models) provides a significant benefit compared to various query aggregation and scoring schemes (e.g., QA and QCM models).

Furthermore, SRM(QC) outperformed SRM(RM1) by at least 2.3%, 1.0%, 2.5%, and 1.8% in nDCG@10, nDCG, nERR@10, and MRR respectively. Thus, using query change as relevance feedback improves performance by a statistically significant amount.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method for modifying a search query to retrieve documents relevant to a user's information need, the method comprising:

compiling session data comprising a first query, a second query, a first set of relevant documents for the first query, a set of user interactions with a subset of the first set of relevant documents, and a set of query changes between the first query and the second query, wherein the set of user interactions comprises respective clicks on hyperlinked titles of the subset of the first set of relevant documents, wherein the set of user interactions further comprises respective amounts of time the user spent reviewing respective relevant documents of the subset of the first set of relevant documents;

generating a feedback model estimating a relevance of search terms to the user's information need based on the set of query changes and the set of user interactions with the subset of the first set of relevant documents, wherein the set of query changes between the first query and the second query comprise at least one added search term that appears in the second query and does not appear in the first query, at least one removed search term that appears in the first query and does not appear in the second query, and at least one retained search term that appears in both the first query and the second query, wherein the feedback model is based on a similarity between the first query and the second query, wherein the similarity is based on a fraction having a numerator and a denominator;

wherein the numerator comprises a sum of products comprising, for respective search terms appearing in both the first query and the second query, a first number of appearances of the respective search term appearing in the query having fewer instances of the respective search term, multiplied by a log of a quotient comprising a total number of documents in a corpus of documents as the numerator and a second number of documents containing the respective search term as the denominator;

wherein the denominator comprises a sum of products comprising, for all respective search terms appearing in any of the first query and the second query, a second number of appearances of the respective search term appearing in the query having more instances of the respective search term, multiplied by a log of a quotient comprising a total number of documents in a corpus of documents as the numerator and a second number of documents containing the respective search term as the denominator;

wherein generating the feedback model comprises:
  identifying a first portion of documents in the subset of the first set of relevant documents and associated with the at least one added search term and the at least one retained search term as having a higher relevance to the user's information need; and
  identifying a second portion of documents in the subset of the first set of relevant documents and associated with the at least one removed search term as having lower relevance to the user's information need;
generating a relevance model estimating a relevance of search terms to the user's information need based on the feedback model and a session relevance model, wherein the session relevance model comprises a representation of the user's information need based on at least one query prior to the second query, wherein the relevance model comprises a weighting parameter applied to the session relevance model and the feedback model, wherein the weighting parameter is based on an information gain associated with the feedback model relative to the session relevance model;
modifying the second query based on the relevance model, wherein modifying the second query further comprises adding at least one related search term to the second query based on the at least one added search term and the at least one retained search term, wherein modifying the second query further comprises deleting the at least one removed search term, wherein modifying the second query further comprises increasing a first weight associated with the at least one added search term and decreasing a second weight associated with the at least one removed search term; and
outputting a second set of relevant documents to a user interface responsive to executing the modified second query, wherein the second set of relevant documents comprises documents associated with the modified second query, the first portion of documents, and wherein the second set of relevant documents does not contain the second portion of documents, wherein the outputting further comprises a respective hyperlinked title and summary of each document of the second set of relevant documents.

* * * * *